United States Patent [19]
Collins et al.

[11] Patent Number: 5,377,502
[45] Date of Patent: Jan. 3, 1995

[54] RIPENING CONTROLLING CHAMBER APPARATUS

[76] Inventors: Harold O. Collins, 7551 E. North La., Scottsdale, Ariz. 85258; James J. Hennessy, 3622 W. Pecan Rd., Phoenix, Ariz. 85041; Gilbert Mancillas, 4320 W. Lewis Ave., Phoenix, Ariz. 85035

[21] Appl. No.: 174,781

[22] Filed: Dec. 29, 1993

[51] Int. Cl.⁶ .................................. F28D 5/00
[52] U.S. Cl. ........................ 62/304; 62/418; 34/195; 34/218
[58] Field of Search ............... 62/418, 309, 304, 310; 34/195, 196, 218, 219, 224, 225, 238

[56] References Cited
U.S. PATENT DOCUMENTS 4,884,411 12/1989 Wallace et al. .................. 62/418

FOREIGN PATENT DOCUMENTS 2236004 2/1973 Germany ...................... 62/418

Primary Examiner—John M. Sollecito
Attorney, Agent, or Firm—H. Gordon Shields

[57] ABSTRACT

Ripening retardation chamber apparatus includes a plenum chamber having a generally open side against which is disposed a pallet full of boxes containing produce. The boxes include openings to allow cooled and moistened air to flow therethrough. An evaporative cooling system is used to provide a flow of cool, moist air into the plenum chamber. The air flow is such as to cause the cooled, moistened air to flow from the plenum chamber through the cartons or boxes of produce. The flow of air causes the heat and ethylene gas produced by the ripening produce to be moved out of the boxes, thus retarding the ripening process. The presence of moisture in the air reduces weight loss of the produce and improves the outer appearance of the produce.

13 Claims, 2 Drawing Sheets

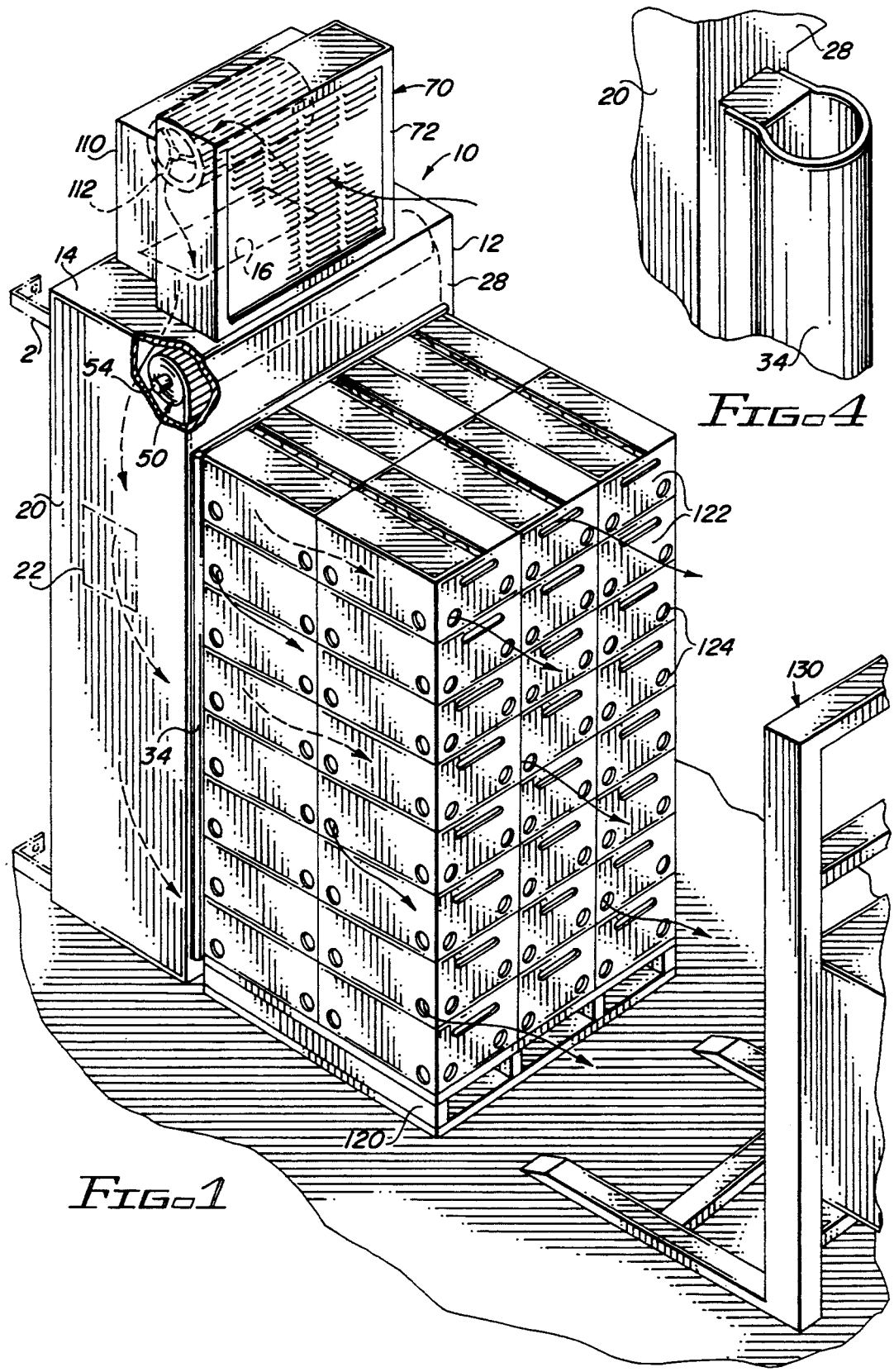

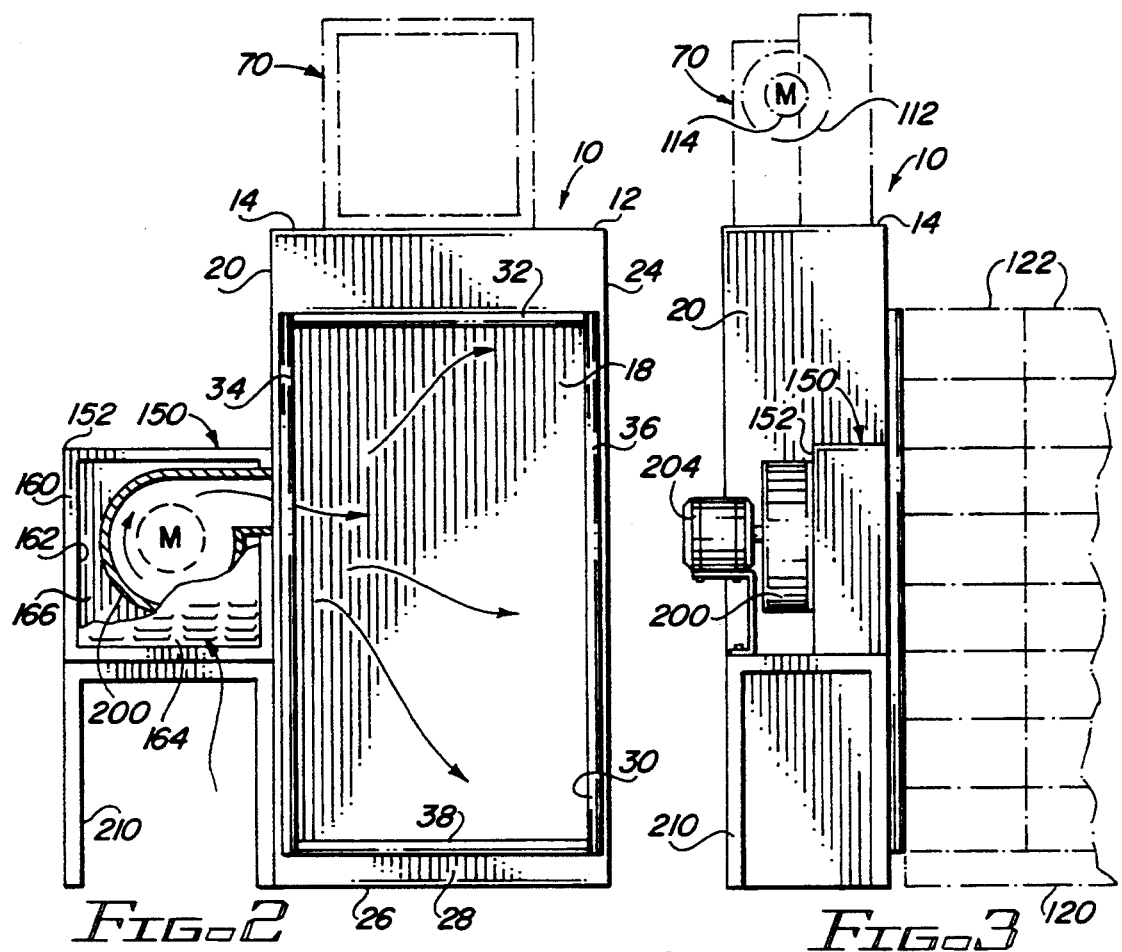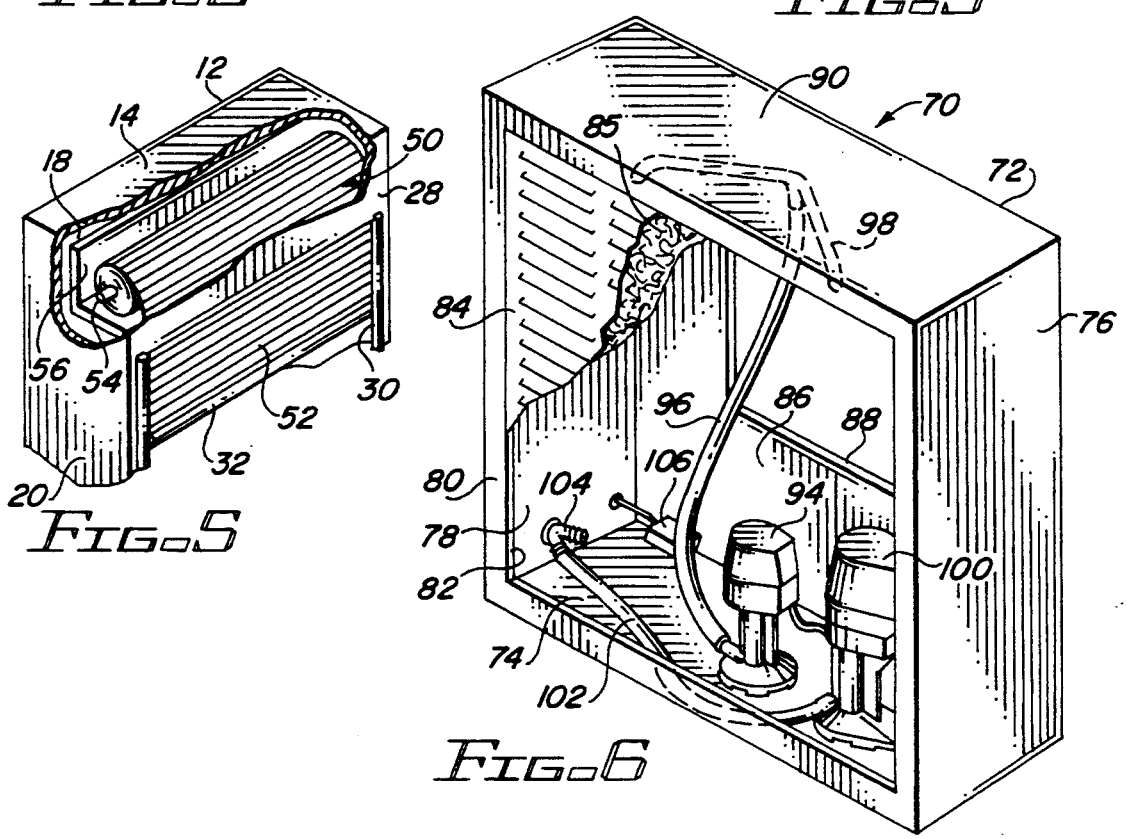

RIPENING CONTROLLING CHAMBER APPARATUS

BACKGROUND OF THE INVENTION

1. Field of the Invention

This invention relates to apparatus for controlling the ripening process of produce and, more particularly to a chamber apparatus for providing a cooled, humidified airflow for cartons or boxes containing produce.

2. Description of the Prior Art

It has been known that produce gives off ethylene gas as it ripens. The giving off of the ethylene gas in a restricted area increases the rate of ripening. This ripening process generates heat which further increases the rate of ethylene gas generation and so on. It has been found that if the production of ethylene gas and heat can be restricted, the ripening process rate may be retarded substantially. The heat generated during the ripening process also causes moisture to be evaporated from the produce at a high rate, thereby reducing the weight of the produce.

In the past, in an attempt to retard the ripening process, it has been necessary to open individual boxes of produce and to re-stack the boxes with substantial space between them to allow escapement of the ethylene gas and heat generated by the ripening process. This activity unfortunately takes valuable time and space and also promotes rapid weight loss and premature drying out of the fruit. The success of such attempts at retarding the ripening process is limited, due to limited availability of space, labor to perform the activity, and wide variations of ambient temperature and humidity conditions.

Many types of produce, such as bananas, are harvested long before they are fully ripe. The produce ripens during the shipping time period between when the produce is harvested and when it is available for sale to the ultimate consumer. This time period can vary from a few days to several weeks.

If the ripening process can be retarded or inhibited, the produce may be harvested later, and the later harvesting allows the produce to grow larger. At the same time, the retarding of the ripening process decreases losses due to the over ripening and the resulting spoiling of the produce. Thus the retarding of the ripening process benefits the producer, the seller, and the consumer. This is particularly true of products such as bananas, which are purchased by volume and sold by weight. Between the purchase of the produce and the sale of the produce, retarding the ripening process results in more produce to sell and, at the same time, prevents a weight loss in the fruit.

The apparatus of the present invention retard the ripening process by providing a plenum chamber against which cartons of produce are disposed. The cartons include apertures or holes, and the air flow from the plenum chamber flows through the cartons and dissipates the ethylene gas and heat produced by the ripening produce. At the same time, the air flow is humidified and cooled, and the combination of the cooled and humidified air and the air flow substantially retards the ripening process and weight loss so that the shelf life of the produce is positively enhanced.

This is accomplished without the need to open the boxes of produce and re-stack them with space between them, as previously explained.

SUMMARY OF THE INVENTION

The invention described and claimed herein comprises a plenum chamber substantially closed on five sides and opened on one side. The open side includes gaskets against which are disposed cartons of produce. The cartons have holes or apertures for air flow. The cartons seal against the gasket so as to allow a flow of air from the plenum chamber outwardly through the holes or apertures in the cartons. An evaporative cooler or humidifying unit provides a positive flow of cooled and humidified air into the plenum chamber. The positive air flow flows through the produce cartons and causes the ethylene gas and heat produced by the ripening produce to be dissipated outwardly. The combination of the dispersed ethylene gas, heat, and the cooled air retards the ripening process of the produce. As the cartons of produce are removed from the top of the stack, a rolling type of door assembly moves downwardly to maintain a seal against the remaining produce cartons.

Among the objects of the present invention are the following:

To provide new and useful apparatus for retarding the ripening of produce;

To provide new and useful plenum chamber apparatus for providing a positive flow of cooled humidified air through produce cartons;

To provide new and useful plenum chamber apparatus having a gasketed opening for sealing against cartons of produce;

To provide new and useful plenum chamber apparatus having an opening controlled by a rolling door assembly; and To provide new and useful apparatus for providing a flow of cooled and humidified air through cartons of produce.

BRIEF DESCRIPTION OF THE DRAWING

FIG. 1 is a perspective view of the apparatus of the present invention in its use environment.

FIG. 2 is a front view of the apparatus of the present invention.

FIG. 3 is a side view of the apparatus of FIG. 2.

FIG. 4 is an enlarged perspective view of a portion of the apparatus of the present invention.

FIG. 5 is a perspective view, partially broken away, illustrating a portion of the apparatus of the present invention.

FIG. 6 is a perspective view illustrating another portion of the apparatus of the present invention.

DESCRIPTION OF The PREFERRED EMBODIMENT

FIG. 1 is a perspective view of ripening retardation chamber apparatus 10 of the present invention. The plenum chamber 12 is a generally rectangularly configured element which includes a top wall 14, a side wall 20, and a front wall 28, as shown in FIG. 1. An evaporative cooling and humidifying unit 70 is shown disposed on the top 14 of the chamber 12. A rolling door assembly 50 is used to seal an opening in the front wall 28 against a plurality of boxes or cartons 122 disposed against the opening in the wall 28.

FIG. 2 is a front view of the apparatus 10, but with the evaporative cooling humidifying unit 70 removed from the top 14 and a unit 150 disposed against the side 20. In FIG. 1, there is an opening 16 extending through the top 14 to allow for a flow of a cooled humidified air from the unit 70 into the inside of the chamber 12. FIG. 1 also shows an opening 22 in dot dash line extending through the side 20 for when an evaporative cooling and humidifying unit is placed against side 20, such as the unit 150 shown in FIG. 2.

FIG. 2 is a front view of the apparatus 10, and FIG. 3 is a side view of the apparatus 10. For the following discussion of the plenum chamber 12 and some of the associated elements, reference will primarily be made to FIGS. 1, 2, and 3. Other figures will be referred to as appropriate.

The plenum chamber 12, in addition to the top wall 14, the side wall 20, the front wall 28, also includes a back wall 18, a second side wall 24, and a bottom wall 26. The front wall 28 includes a relatively large opening 30 extending through the wall 28. Disposed about the opening 30 are four gaskets, including a top gasket 32, a pair of side gaskets 34 and 36, and a bottom gasket 38. The gaskets 32, 34, 36, and 38 essentially frame the opening 30.

The gasket 32 is not secured to the front wall 28, but rather is secured to the bottom of the rolling door 50. Accordingly, the gasket 32 moves downwardly with the door 50 to seal the top of the opening 30 against the boxes or cartons 122 of produce as the boxes or cartons are removed from the top of the stack for use, as required.

A portion of the gasket 34 is shown in FIG. 4. FIG. 4 comprises an enlarged perspective view of a portion of the apparatus 10. The gaskets 32, 34, 36, and 38 may all be alike, and may simply be enlarged loops of an appropriate flexible sealing material, well known and understood in the art.

In FIG. 1, a pallet 120 is shown with a plurality of boxes 122 of produce, such as bananas, stacked thereon. The pallet 120 is disposed against the bottom of the front wall 28, with the boxes 122 disposed against the gaskets 32, 34, 36, and 38, to essentially seal the boxes 122 against the chamber 12. The boxes include a plurality of holes 124 extending through them. The holes 124 allow for the flow of air from the plenum chamber 12 through all of the boxes. The air flowing through the plenum chamber is, as discussed above, cooled and humidified. Thus, the flow of air performs three functions, the first of which is to remove ethylene gas, the second is to remove heat, both of which retard the ripening process. The third is to provide humid air which retards evaporation of moisture from the produce and therefore reduces weight loss.

The chamber apparatus 10 is placed in its use environment, such as in a retail establishment, with the forklift 130 used to move the pallet 120 with the boxes 122 thereon against the gasket elements which frame the opening 30. The boxes 122 are used from the top, and accordingly when the rear row of boxes is removed from the top of the stack of boxes, a portion of the opening 30 is exposed. For sealing the opening 30, the rolling door assembly 50 is used.

FIG. 5 is a perspective view of a portion of the chamber 12, namely the upper portion, with a part of the top 14 and the side wall 20 and the front wall 28 broken away to show the rolling door assembly 50. Similarly, a portion of the cabinet chamber 12 has been broken away in FIG. 1 to show a portion of the rolling door assembly 50.

The rolling door assembly 50 includes a rolling door 52 disposed on a shaft 54. The shaft 54 is appropriately secured to support structure 56. The support structure 56 is in turn appropriately secured to the plenum chamber 12. A motor, not shown, may be used to rotate the shaft 54 to move the door 52 upwardly and downwardly to cover or to close the opening 30 as the boxes 102 are removed from the top of the stack. The door 52 is disposed between the side gasket elements 34 and 36. The top element gasket 32 is affixed to the lower edge of door 52, as mentioned, to maintain an appropriate seal for the flow of air from the chamber 12 outwardly through the boxes 122, and specifically through the holes 124 in the boxes 122.

If desired, the door 52 may be manually operated, rather than operated by a motor.

In FIG. 1, an evaporative cooler or humidifying assembly 70 is shown disposed on the top 14 of the housing or plenum chamber 12. The evaporative cooler or humidifying assembly 70 includes an evaporative media housing 72 to which is secured a blower unit, such as shown in FIG. 3, and as will be discussed below.

The evaporative media housing 72 includes a bottom wall 74, a pair of upwardly extending side walls 76 and 78, a front wall 80, and a rear wall 86. An opening 82 extends through the front 80. A louvered evaporative media holder plate 84 is disposed in the opening 82. Appropriate evaporative media 85 is secured to the holder plate 84.

The rear wall 86 includes an opening 88. A blower unit is disposed in the opening 88. The blower unit will pull air through the evaporative media secured to the plate 84 and the in flow of air will be directed downwardly through the opening 16 and the top 14 and into the interior of the chamber 12.

Two pumps are disposed on the bottom wall 74. The pumps include a supply pump 94 and a drain pump 100. The supply pump 94 provides water through a water distribution conduit 98 through a conduit 96. The water distribution conduit 98 is disposed adjacent to the bottom of the top wall 90 and provides water for the evaporative media, not shown.

The drain pump 100 is connected to a drain conduit 102 which extends to an overflow pipe 104. The overflow pipe 104 extends through an opening in the side wall 78 to carry excess water, either overflow water from the bottom of the housing 72, or water drained from the bottom of the housing 72 by the drain pump 100 out of the unit 70. The overflow pipe 104 is appropriately connected to a conduit or hose that allows the water flowing through the conduit 104 to drain safely away from the apparatus 10.

Water flowing into the housing 72 is controlled by a float 106. The use of the float 106 and the pumps 94 and 100 are well known and understood in the art.

As best shown in FIG. 1, the evaporative cooler or humidifying assembly 70 is secured to the blower housing 110. Within the housing 110 is a blower 112. The blower 112 is powered by a motor, not shown, but see discussion below regarding the assembly 150. As indicated above, the blower 112 blows air through the louvers in the plate 84, through the water saturated evaporative media disposed against the plate 84 and through the opening 88 into the housing 110. From the housing 110 the cooled and humidified air then flows downwardly through the opening 16 in the top wall 14 of the plenum chamber 12, as indicated by the dashed arrows in FIG. 1. The cooled and humidified air then flows through the holes or apertures 124 in the boxes or cartons 122 of produce to carry ethylene gas and heat away from the produce in the boxes.

When the use of a top mounted evaporative cooling unit 70 and blower housing 110 is not desired, a side mounted evaporative cooling and humidifying unit 150, such as shown in FIGS. 2 and 3, may be used.

The assembly or unit 150 includes a housing 152 which is substantially identical to the unit 70 and its housing 72. The evaporative unit 150 is substantially identical to the unit 70. The housing ]52 includes a front wall 160 through which extends an opening 162. A holder plate 164 is disposed in the opening 162. The unit also includes a rear wall 166 which includes an opening to which a blower housing 200 is secured.

The blower housing 200 is best shown in FIG. 3. The blower housing 200 encloses a blower, not shown, to which is connected a blower motor 204. The blower housing 200 is disposed against the opening 22 in the side wall 20 to provide the positive flow of cooled and humidified or moisturized air into the interior of the plenum chamber 12. A support stand or table 210 is shown in FIGS. 2 and 3 to support the unit 150 and its associated blower housing 200 and related elements.

Returning again to FIG. 5, it will be noted that the door 52 is shown as comprising a plurality of slats or segments that will allow the door to roll. If desired, a continuous panel of flexible material may also be used. In both cases, appropriate side sealing elements will be used, as required and as well known and understood.

Returning again to FIG. 1, brackets 2 are shown in dash dot line for securing the apparatus 10 to a wall. Typically, the apparatus 10 will be installed adjacent to a wall and secured thereto. Since, the apparatus 10 is self contained, only a water source and a power source neither of which are shown, need be provided for operation of the apparatus.

The apparatus 10 is shown with a bottom floor. If desired, the bottom floor may De omitted, and appropriate seal strips may be disposed on the bottom of the four walls to seal the walls to a floor on which the floorless apparatus is disposed.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What we claim is:

1. Apparatus for controlling the ripening of boxed produce comprising in combination:
   plenum chamber means for receiving a flow of air, including a front wall having an opening against which boxed produce; and means for providing a flow of air into the plenum chamber means and through the opening in the front wall to the boxed produce is disposed and a rolling door for sealing the opening against the boxed produce.

2. The apparatus of claim 1 in which the plenum chamber means further includes means for sealing the opening against the boxed produce to control the flow of air through the opening.

3. The apparatus of claim 1 in which the means for providing a flow of air into the plenum chamber means includes means for humidifying the flow of air to provide moisture in the flow of air for the produce.

4. The apparatus of claim 1 in which the means for providing a flow of air comprises an evaporative cooler including
   evaporative media through which air flows,
   pump means for providing water to the evaporative media, and
   blower means for providing a flow of air through the evaporative media and into the plenum chamber means.

5. The apparatus of claim 1 in which the opening in the front wall of the plenum chamber means includes a top portion, two side portions, and a bottom portion, and the plenum chamber means further includes means disposed on the front wall for sealing the two side portions, and the bottom portion against the boxed produce.

6. The apparatus of claim 1 in which the door means further includes a seal on the rolling door for sealing the rolling door against the boxed produce.

7. The apparatus of claim 6 in which the means for providing a flow of air into the plenum chamber means includes means for adding moisture to the flow of air.

8. Apparatus for controlling the ripening of produce comprising in combination:
   plenum chamber means, including
   a top wall,
   a first side wall, connected to the top wall,
   a second side wall connected to the top wall,
   a base wall connected to the top wall and to the two side walls,
   a front wall connected to the top wall and to the two side walls, and
   an opening in the front wall;
   a plurality of boxes for holding produce disposed against the opening in the front wall, each box having openings through which air flows from the plenum chamber means;
   means for sealing the opening in the front wall against the plurality of boxes of produce, including a rolling door for covering the opening downwardly from the top between the two sides; and
   means for providing a flow of air in the plenum chamber means and through the plurality of boxes and over the produce disposed therein.

9. The apparatus of claim 8 in which the means for providing a flow of air further includes means for providing moisture in the flow of air.

10. The apparatus of claim 8 in which the door means further includes a seal on the rolling door for sealing the rolling door against the plurality of boxes.

11. The apparatus of claim 10 in which the plenum chamber means further includes means for sealing the opening adjacent to the rolling door.

12. Apparatus for controlling the ripening of produce comprising in combination: a plenum chamber, including
   a front wall, and
   an opening in the front wall;
   a plurality of boxes for holding produce disposed against the opening in the front wall, each box having openings through which air flows from the plenum chamber;
   a door for sealing the opening against the plurality of boxes of produce; and
   means for providing a flow of humidified air in the plenum chamber and through the plurality of boxes of produce disposed against the opening.

13. The apparatus of claim 12 in which the door is a rolling door.

* * * * *